United States Patent
Zeng et al.

(10) Patent No.: US 9,429,650 B2
(45) Date of Patent: Aug. 30, 2016

(54) FUSION OF OBSTACLE DETECTION USING RADAR AND CAMERA

(75) Inventors: Shuqing Zeng, Sterling Heights, MI (US); Wende Zhang, Troy, MI (US); Bakhtiar Brian Litkouhi, Washington, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 711 days.

(21) Appl. No.: 13/563,993

(22) Filed: Aug. 1, 2012

(65) Prior Publication Data

US 2014/0035775 A1 Feb. 6, 2014

(51) Int. Cl.
*G01S 13/86* (2006.01)
*G01S 13/93* (2006.01)
*G06K 9/00* (2006.01)
*G06K 9/62* (2006.01)

(52) U.S. Cl.
CPC ............ *G01S 13/931* (2013.01); *G01S 13/867* (2013.01); *G06K 9/00805* (2013.01); *G06K 9/629* (2013.01)

(58) Field of Classification Search
CPC .............. G01S 13/867; G01S 13/931; G06K 9/00805; G06K 9/629
See application file for complete search history.

(56) References Cited

U.S. PATENT DOCUMENTS

| | | | |
|---|---|---|---|
| 6,414,712 B1* | 7/2002 | Wanielik ................ | G01C 21/28 348/118 |
| 7,460,951 B2 | 12/2008 | Altan et al. | |
| 2005/0004762 A1* | 1/2005 | Takahama et al. ........... | 701/301 |
| 2006/0091654 A1* | 5/2006 | De Mersseman et al. ... | 280/735 |
| 2007/0121998 A1* | 5/2007 | Stein ............................. | 382/103 |
| 2008/0243383 A1* | 10/2008 | Lin ............................... | 701/213 |
| 2010/0104199 A1* | 4/2010 | Zhang et al. .................. | 382/199 |
| 2010/0191391 A1* | 7/2010 | Zeng ................................. | 701/1 |
| 2011/0298654 A1* | 12/2011 | Hellsten .............. | G01S 13/9029 342/25 A |
| 2012/0134577 A1* | 5/2012 | Sabe et al. ..................... | 382/159 |

* cited by examiner

*Primary Examiner* — Timothy A Brainard

(57) ABSTRACT

A vehicle obstacle detection system includes an imaging system for capturing objects in a field of view and a radar device for sensing objects in a substantially same field of view. The substantially same field of view is partitioned into an occupancy grid having a plurality of observation cells. A fusion module receives radar data from the radar device and imaging data from the imaging system. The fusion module projects the occupancy grid and associated radar data onto the captured image. The fusion module extracts features from each corresponding cell using sensor data from the radar device and imaging data from the imaging system. A primary classifier determines whether an extracted feature extracted from a respective observation cell is an obstacle.

21 Claims, 4 Drawing Sheets

FUSION OF OBSTACLE DETECTION USING RADAR AND CAMERA

BACKGROUND OF INVENTION

An embodiment relates generally to obstacle detection.

Vision-imaging systems are used in vehicles for enhancing applications such as object detection systems and other vision/positioning systems. Such systems utilize a camera to capture the image and then extract objects from the image. Such objects may be other vehicles, pedestrians, or even objects within a road of travel.

Radar systems are also used to detect objects within the road of travel. Radar systems utilize radio waves to determine the range, altitude, direction, or speed of objects. A transmitter transmits pulses of radio waves which bounce off any object in their path. The pulses reflected off the object returns a small part of the radio wave's energy to a receiver which is typically located at the same location as the transmitter.

Detecting objects by cooperatively utilizing vision-imaging systems and radar systems would add confidence as to the detection and position of an object in the path of travel of a vehicle. However, in known systems, detection is performed independently of the other sensors then the results are later combined. The problem is that if the detection and tracking results as determined from one tracking device differs significantly from the detection and tracking results from another device, then if the results were to be cooperatively utilized, there would be much uncertainty as which data would be the more correct data to utilize in identifying an obstacle.

SUMMARY OF INVENTION

An advantage of an embodiment is the accuracy in identifying an obstacle as detected by two different obstacle sensing devices. The fusion of the outputs from the two obstacle sensing devices is performed at the sensor level, thereby taking advantage of the richer content of information. Detection and tracking of identified obstacles after data from both sensing devices is combined. As a result, accuracy in identifying an obstacle at a respective location by fusing the information at the sensor level is increased in contrast to performing detection and tracking on data from each respective device first and then fusing the detection and tracking data thereafter.

An embodiment contemplates a vehicle obstacle detection system including an imaging system for capturing objects in a field of view and a radar device for sensing objects in a substantially same field of view. The substantially same field of view is partitioned into an occupancy grid having a plurality of observation cells. A fusion module receives radar data from the radar device and imaging data from the imaging system. The fusion module projects the occupancy grid and associated radar data onto the captured image. The fusion module extracts features from each corresponding cell using sensor data from the radar device and imaging data from the imaging system. A primary classifier determines whether an extracted feature extracted from a respective observation cell is an obstacle.

An embodiment contemplates a method of for determining an obstacle exterior of a vehicle. Objects are captured in a field of view by an imaging system. Objects in a substantially same field of view a radar device are sensed. The substantially same field of view sensed by the radar device is partitioned into an occupancy grid having a plurality of observation cells. A fusion module receives radar data from the radar device and imaging data from the imaging system. The fusion module projects the occupancy grid and associated radar data onto the captured image. The fusion module extracts features from each corresponding cell using sensor data from the radar device and imaging data from the imaging system for identifying potential obstacles. The extracted features are classified by a primary classifier for determining whether the extracted from a respective observation cell is an obstacle.

DETAILED DESCRIPTION

Figure 1:
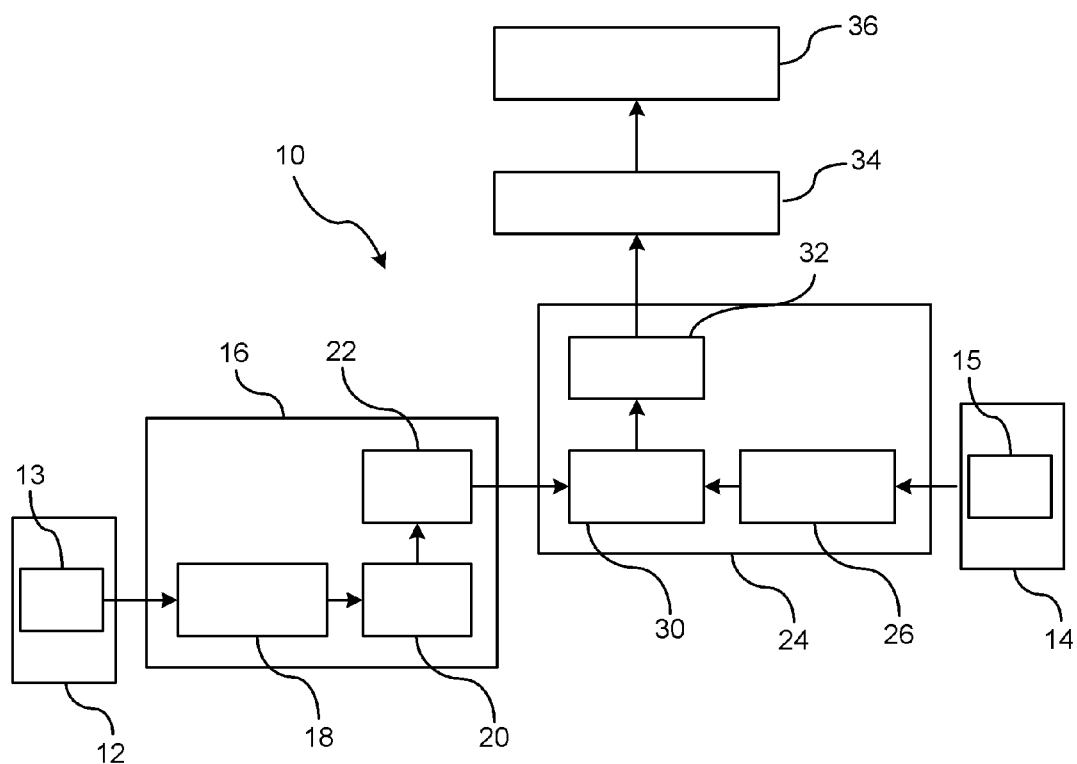
FIG. 1 is a block diagram of a vehicle obstacle detection system.

There is shown in FIG. 1 block a diagram of a vehicle obstacle detection system 10. The system 10 includes a radar device 12 and an imaging system 14.

The radar device 12 uses radio waves to detect an object by obtaining range, azimuth angle, and range rate data relating to the object. The radar device 12 includes a receiver 13 which receives a reflected electromagnetic signal relating to objects detected in a path of travel. The received signals are provided to a preprocessing unit 16 for conditioning the signal so that data may be cooperatively processed with the data from the imaging system 14. The preprocessing unit 16 includes a down converter 18 that receives the radar transmission, amplifies the signal and downconverts a block of frequencies to a lower block of intermediate frequencies where the signal is provided to an analog to digital signal converter 20. A Fast-Fourier transform 22 is applied to the converted digital signal to obtain the frequency distribution of the signal for filtering, compression, and noise reduction of the signal. A constant false alarm rate algorithm (CFAR) is then applied to detect target in the field-of-view of radar. The output of 22 is the signal-to-noise ratio of each cell and is fed as input to a fusion module 24.

The imaging system 14 includes an image capture device 15 including, but not limited to, a camera. The image capture device captures an image of the road, typically the area directed in the front of the vehicle. However, the captured region may include areas other than an area directed in front of the vehicle, such as the sides or the rear of the vehicle. The data from the captured images are provided to a vision-based preprocessing unit 26. The preprocessing unit 26 is for rectification, scaling, filtering and noise reduction of the input captured image.

The fusion module 24 includes a feature extraction submodule 30 and a detection and tracking submodule 32. It should be understood that the various submodules may include an independent processor or may include a single processor. Data from the preprocessing unit of radar module 16 and the data from the preprocessing unit of camera 26 are combined in the feature extraction submodule 30. The data from each respective submodule is cooperatively analyzed for identifying features of potential objects in the feature extraction submodule 30.

The detection and tracking submodule 32 tracks features that are identified as potential object over instances of time. Temporal smoothing, in addition to spatial smoothing, may be used to track and identify notable features within the captured data at different instances of time.

The identified features output from the fusion module 24 are input to a classifier 34, such as a logical classifier. The classifier, (e.g., support vector machine or other type of classifier) can be used for classifying whether the respective feature is an object in the captured data.

An example of classifier is a support vector machine (SVM) that includes a set of related learning algorithms used for classification and regression. The learning algorithms are training methods that build models used to predict whether a new sample falls into one category or another category (e.g., clear path and non-clear path). The SVM model is a representation of categories of points in feature space and mapped so that the separate categories are divided by a clear gap. The support vector machine maps input data to a higher dimensional space where a maximal separating hyperplane is constructed. An example of using a support vector machine is to construct two parallel hyperplanes. The two parallel hyperplanes are constructed on each side of the separating hyperplane for separating the data. The separating hyperplane maximizes the distance between the two parallel hyperplanes. A good separation is desired between the parallel hyperplanes that have the largest spatial distance to the nearest training datapoints of any class. The basic concept is that the larger the distance between the two parallel hyperplanes, the lower the misclassification rate will be when classifying the data to a respective class.

The output from the classifier 34 is provided to active safety devices or active safety systems 36 which use the identification of objects for vehicle active safety applications that include, but are not limited to, driver alert notification such as forward collision warning systems, autonomous or semi-autonomous collision avoidance systems, collision preparedness systems, and collision mitigation systems.

Figure 2:
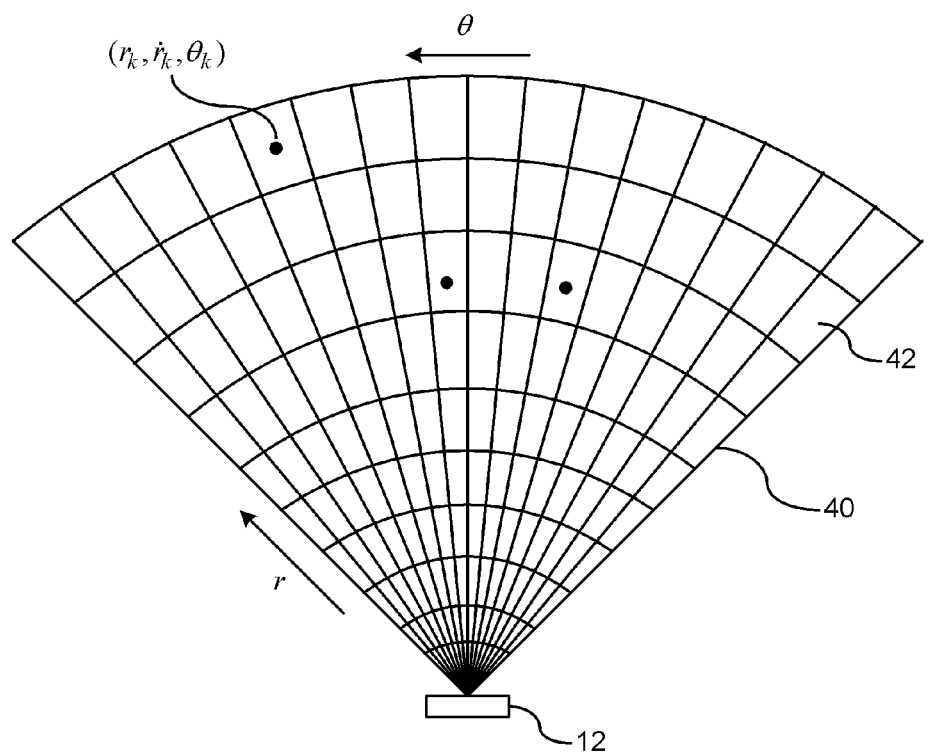
FIG. 2 is a schematic of a sensed occupancy radar grid.

FIG. 2 illustrates a sensed occupancy radar grid. The radar device 12 generates an electromagnetic field. The radar device 12 transmits pulses of radio waves which reflect off any object in the transmission path. A portion of the energy wave that is reflected off the object is returned to an antenna which is usually located at the same site as the transmitter. The field generated by radar device is characterized as an occupancy grid 40 having a plurality of observation cells 42. Features are extracted from each cell for determining whether the feature is an object. Each feature within a respective cell can be identified as having parameter observations having 3 dimensions (3-D). The 3-D may include range, range rate, and azimuth ($r_k$, $\dot{r}_k$, $\theta_k$). For each feature identified in each observation cell, the feature will be identified by respective parameter observation data ($r_k$, $\dot{r}_k$, $\theta_k$). In one of embodiments, the feature within a cell is the signal-to-noise ratio computed by the CFAR algorithm in 22. It should be understood that other methods may be used to target and identify features within a cell without deviating from the scope of the invention.

Figure 3:
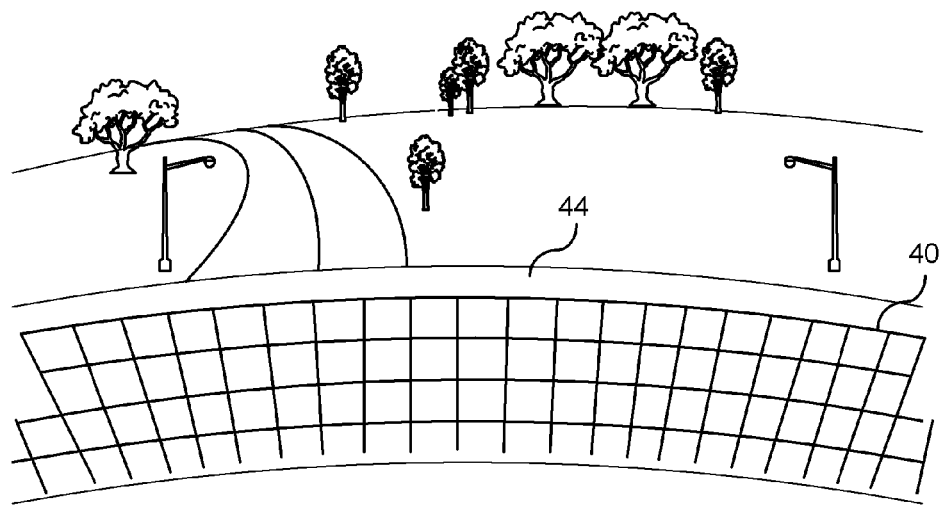
FIG. 3 is an exemplary image captured by the imaging system.

FIG. 3 illustrates an image captured by the imaging system. The image contains vehicle roadways 44 and other scenes exterior of the vehicle. The occupancy grid 40 as generated from the sensed radar data is projected onto the captured image. The occupancy grid 40 is projected such that each observation cell geographically located in the radar data corresponds to the same geographical location in the capture image. The logistic classifier is used to determine whether a feature in a respective cell may be an object or no object. The logistic classifier may also be trained for not only determining whether a feature in each cell is an object, but may be used to further distinguish the object as a pedestrian, vehicle, or other obstacle. The logistic classifier determines a posterior probability of each respective cell being occupied by cooperatively analyzing both the radar parameters of the cell and the image parameters of the cell. Such features include but are not limited to color, texture, motion, radar FFT spectrum. Given a grid (O), for every cell (o), a posterior probability of the cell (o) being occupied is determined based on the following formula:

$$p(o=1|k,f,m)$$

where evidence r is a feature sensed in the radar signal, f is a vision feature extracted from a respective cell, and m is a feature derived from motion flow. Motion flow may be determined by identifying abnormality of a scene with respect to the ground flow.

To fuse the results from the radar and vision devices, let the contents of each cell represent a fused feature vector x=(r, f, m). A Log classification may be represented as follows:

$$\text{Log}\,[p(o=1|x)/p(o=0|x)] = \beta_0 + \beta_1 x_1 + \ldots + \beta_k x_k$$

where $\{\beta_k\}$ are weights learned from logistic regression from labeled training samples. The following expression can be applied for estimating the probability that the feature is an object:

$$p(o=1|x) = \exp(\beta_0 + \beta_1 x_1 + \ldots + \beta_k x_k)/(1 + \exp(\beta_0 + \beta_1 x_1 + \ldots + \beta_k x_k)).$$

Alternatively, the following expression can be applied for estimating the probability of whether the feature is not an object:

$$p(o=0|x) = 1/(1 + \exp(\beta_0 + \beta_1 x_1 + \ldots + \beta_k x_k)).$$

As described earlier, the classifier is a data analysis program that can be trained using characteristics of an object/device to distinguish between classes to which the characteristics belong (e.g., support vector machine). As a result, the logistic classifier may be trained to distinguish between an object being present and no object being present within a respective cell, or the classifier may be used to distinguish as to what the object relates to. For example, the classifier can be trained to distinguish whether the object is a pedestrian, a vehicle, or other identifiable obstacle within the road.

Once a posterior probability estimate is determined by the classifier, the posterior probability estimate may be refined by considering spatial constraints and temporal constraints of the identified object. Temporal constraints involve features that are relocated to a different cell between at least two time-displaced images. Estimates are determined as to whether a feature can be relocated to another cell within the grid based on an elapsed time between the captured images. Spatial constraints relate to whether features between two adjacent cells are related to one another. For example, spatial constraints may be identified based on motion continuity and/or appearance consistency.

The following expression is a probability estimate that takes into account the posterior probability estimate contribution, temporal constraint contribution, and the spatial constraint contribution:

$$P_t(o=1|x) \alpha P_{t-1,c}(o=1|x) + \beta P_{t,c}(o=1|x) + \rho_l P_{t,l}(o=1|x) + \rho_r P_{t,r}(o=1|x) + \rho_u P_{t,u}(o=1|x) + \rho_d P_{t,d}(o=1|x)$$

where $\alpha P_{t-1,c}(o=1|x)$ is a temporal contribution for estimating the posterior probability, $\beta P_{t,c}(o=1|x)$ is a current contribution for estimating the posterior probability, $\rho_l P_{t,l}(o=1|x) + \rho_r P_{t,r}(o=1|x) + \rho_u P_{t,u}(o=1|x) + \rho_d P_{t,d}(o=1|x)$ is a spatial contribution for estimating the posterior probability, $\beta$ is a constant of the current contribution, $\alpha$ is a weight defined by a similarity between corresponding samples at time t and time t−1, and $\rho_x$ is a weight defined by a spatial similarity between neighboring samples.

Figure 4:
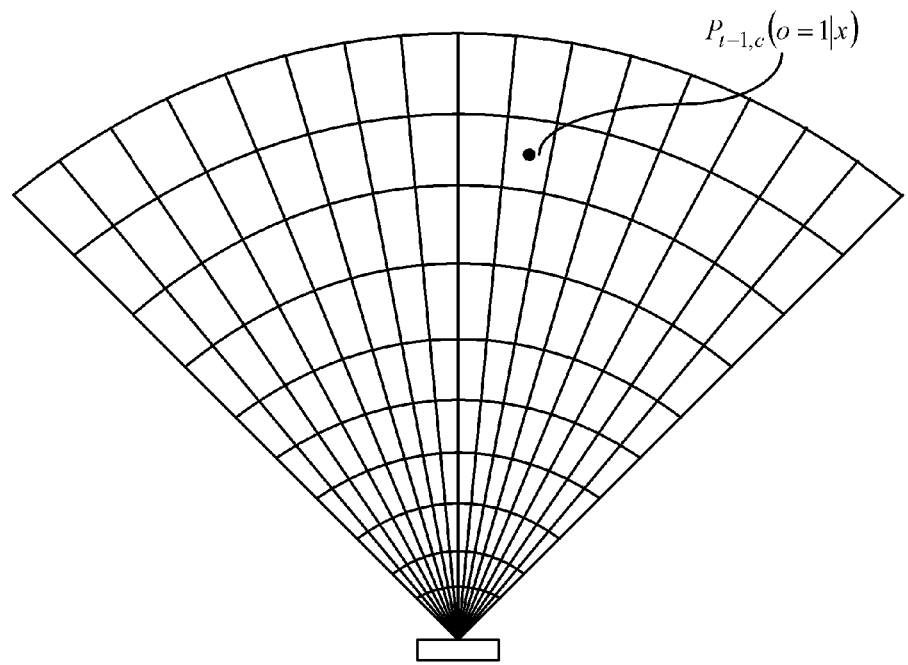
FIG. 4 is an occupancy grid illustrating a probability of an identified feature at a prior instance of time.
Figure 5:
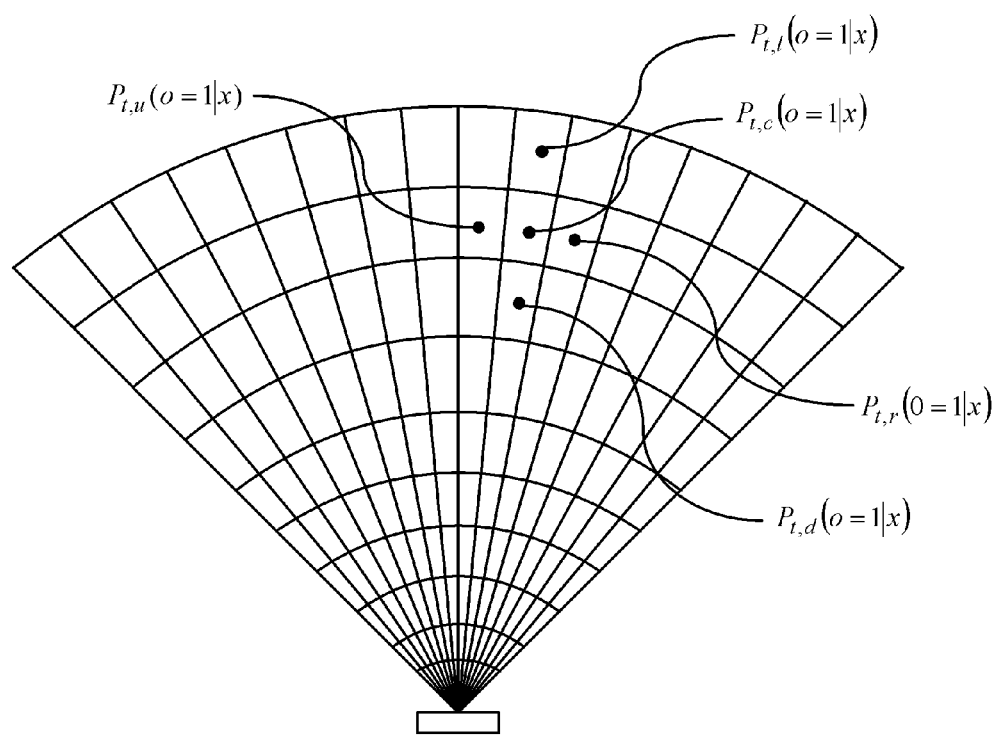
FIG. 5 is an occupancy grid illustrating a refinement of a probability of an identified feature at a current instance of time.

FIG. 4 illustrates a feature having a determined posterior probability $P_{t-1,c}(o=1|x)$ at time instance t−1. FIG. 5 illustrates the feature where motion compensation and temporal compensation is applied to determine the probability $P_{t,c}(o=1|x)$ of the feature at time instance t. In addition, spatial compensation is applied for identifying neighboring cells at time instance t. Adjacent cells are identified by the following probability estimates $P_{t,l}(o=1|x)$, $P_{t,r}(0=1|x)$, $P_{t,u}(o=1|x)$, and $P_{t,d}(o=1|x)$.

Figure 6:
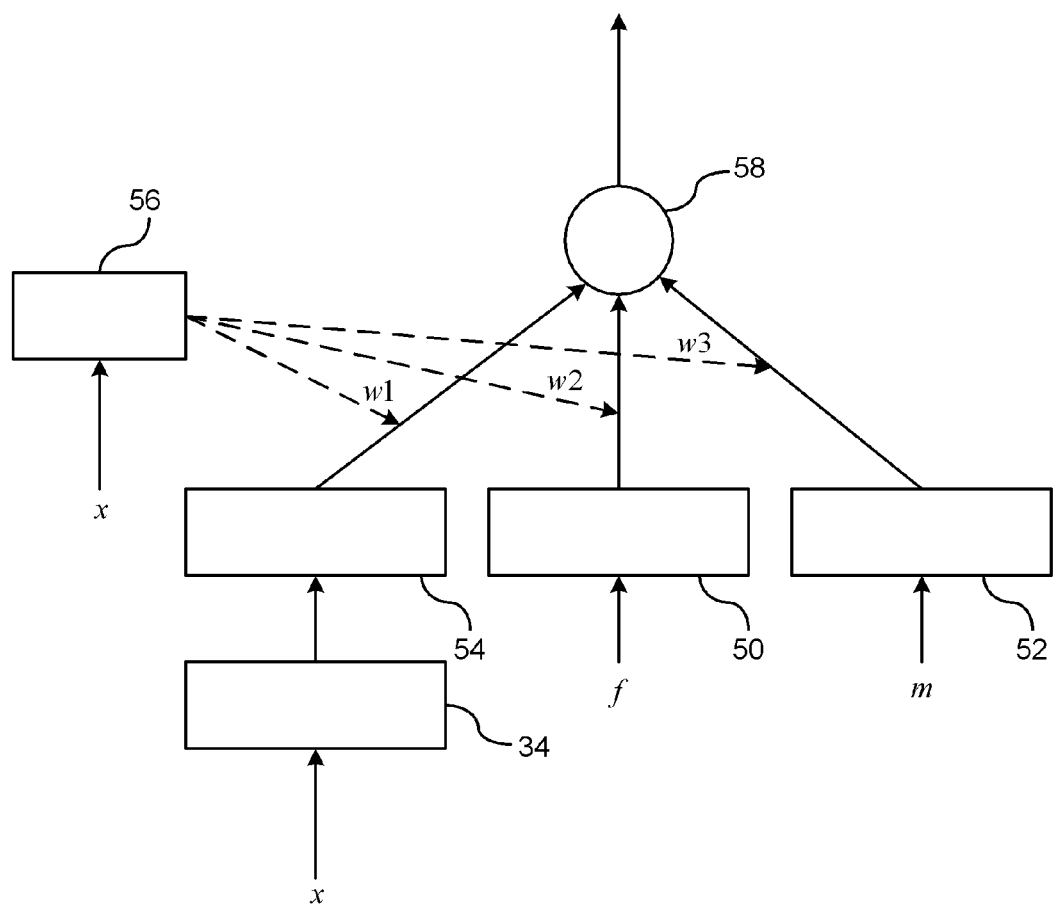
FIG. 6 is a block diagram for fusing outputs of a plurality of classifiers.

FIG. 6 illustrates a block diagram of a refinement of the posterior probability estimation using a plurality of classifier output results. The posterior probability estimation or the refined posterior probability estimation incorporating spatial/temporal compensation is further refined by fusing results from a plurality of classifiers. Other classifiers may include, but are not limited to, clear path classifiers and motion flow abnormality classifiers. Referring to FIG. 6, the logistic classifier 34, a clear path classifier 50, and a motion flow abnormality classifier 52 each independently generate estimations as to whether a feature of a cell is an object. Spatial and temporal smoothing 54 as described herein may be applied to the output of the logistic classifier 34.

A selector 56 determines weighting values that are applied to the outputs of each classifier for determining which classifiers may be relied on during the fusion process. The weights are determined through training (e.g., ground truth labeling). Each of the classifiers could have an equal distribution of weights or an unequal distribution of weights. Some classifiers may produce better results during nighttime analysis, their results are given greater weight because of the accuracy of the result during the present condition. Therefore, the selector 56 determines certain criteria of an event or condition and applies the weights according to the present criteria. For example, if a video is frozen or a region is blocked by an obstacle, then the classifiers that utilize data from video images may give none or very little weight in the fused analysis. Alternatively, if sensing devices on the vehicle has inconsistent performance, then the classifiers utilizing those sensing devices may have lower weighting.

In FIG. 6, the results are provided to a fusing module 58 where the results along with their respective weights are processed cooperatively for producing a result that further refines the decision as to whether the cell contains an object, or more specifically, the type of objected detected.

The results may be provided to other safety application processors of the vehicle which utilize this information for enabling safety precautionary devices, alert devices, collision avoidance devices (e.g., braking, steering), or other preparatory or mitigation devices that will assist the driver in avoiding a collision with detected objects within the road.

While certain embodiments of the present invention have been described in detail, those familiar with the art to which this invention relates will recognize various alternative designs and embodiments for practicing the invention as defined by the following claims.

What is claimed is:

1. A vehicle obstacle detection system comprising:
an imaging system for capturing objects in a field of view;
a radar device for sensing objects in a substantially same field of view, the substantially same field of view being partitioned into an occupancy grid having a plurality of observation cells, the occupancy grid partitioned angularly and radially to form the plurality of observation cells;
a fusion module for receiving radar data from the radar device and imaging data from the imaging system, the fusion module projecting the occupancy grid and associated radar data onto the captured image, the fusion module extracting features from each corresponding cell using sensor data from the radar device and imaging data from the imaging system
a primary classifier for determining whether an extracted feature extracted from a respective observation cell is an obstacle; and
at least one secondary classifier for classifying obstacles exterior of the vehicle, wherein weighting is applied to an output of the primary classifier and outputs of the at least one secondary classifier, wherein the weighted output of the primary classifier and the weighted output of the at least one secondary classifier are used to cooperatively identify obstacles in the field of view.

2. The vehicle obstacle detection system of claim 1 wherein the extracted feature extracted within the respective observation cell is represented by vector comprising a radar feature, a vision feature, and a motion feature.

3. The vehicle obstacle detection system of claim 1 wherein the output from the fusion module generates a feature parameter observation that includes a range, a range rate, and an azimuth angle.

4. The vehicle obstacle detection system of claim 1 wherein the at least one secondary classifier is a clear path detection classifier.

5. The vehicle obstacle detection system of claim 1 wherein the at least one secondary classifier is a motion flow abnormality classifier.

6. The vehicle obstacle detection system of claim 1 further comprising vehicle safety applications, wherein the safety applications utilize the identified obstacle for actuating safety related devices of the vehicle when a potential collision is possible between the vehicle and the obstacle.

7. A method for determining an obstacle exterior of a vehicle comprising the steps of:
capturing objects in a field of view by an imaging system;
sensing objects in a substantially same field of view a radar device, partitioning the substantially same field of view sensed by the radar device into an occupancy grid having a plurality of observation cells, the occupancy grid partitioned angularly and radially to form the plurality of observation cells;
receiving, by a fusion module, radar data from the radar device and imaging data from the imaging system, the fusion module projecting the occupancy grid and associated radar data onto the captured image, the fusion module extracts features from each corresponding cell using sensor data from the radar device and imaging data from the imaging system for identifying potential obstacles; and
classifying the extracted feature by a primary classifier for determining whether the extracted from a respective observation cell is an obstacle, wherein the primary classifier determines a posterior probability estimation for each respective cell for identifying whether a feature located within each respective cell is an obstacle, and wherein the posterior probability estimation is calculated based on radar and imaging system data.

8. The method of claim 7 wherein the posterior probability estimation for determining whether the feature is an obstacle is determined using the following formula:

$$p(o=1|x)=\exp(\beta_0+\beta_1 x_1+\ldots+\beta_k x_k)/(1+\exp(\beta_0+\beta_1 x_1+\ldots+\beta_k x_k))$$

where x us a respective vector represented by radar feature data, image feature data, and feature motion flow data, and β is a weight defined by similarity between corresponding samples at time t and time t−1.

9. The method of claim 8 wherein a posterior probability estimation for determining whether the feature is not an obstacle is determined using the following formula:

$$p(o=0|x)=1/(1+\exp(\beta_0+\beta_1 x_1+\ldots+\beta_k x_k))$$

where x us a respective vector represented by radar feature data, image feature data, and feature motion flow data, and β is a weight factor.

10. The method of claim 7 wherein at least one secondary classifier classifies obstacles exterior of the vehicle, wherein weighting is applied to an output of the primary classifier and outputs of the at least one secondary classifier, wherein the weighted output of the primary classifier and the weighted output of the at least one secondary classifier are used to cooperatively identify obstacles in the field of view.

11. The method of claim 7 wherein the data obtained from the radar device is provided to a preprocessing module, wherein the preprocessing module applies a constant false alarm rate technique to detect a target in the field-of-view of radar, and wherein an output from the preprocessing module is a signal-to-noise ratio of each cell that is provided to the fusion module.

12. A vehicle obstacle detection system comprising:
an imaging system for capturing objects in a field of view;
a radar device for sensing objects in a substantially same field of view, the substantially same field of view being partitioned into an occupancy grid having a plurality of observation cells, the occupancy grid partitioned angularly and radially to form the plurality of observation cells;
a fusion module for receiving radar data from the radar device and imaging data from the imaging system, the fusion module projecting the occupancy grid and associated radar data onto the captured image, the fusion module extracting features from each corresponding cell using sensor data from the radar device and imaging data from the imaging system; and
a primary classifier for determining whether an extracted feature extracted from a respective observation cell is an obstacle,
wherein a posterior probability estimation is determined by the classifier for each respective cell for identifying whether a feature located within each respective cell is an obstacle, and wherein the posterior probability estimation is calculated based on radar and imaging system data.

13. The vehicle obstacle detection system of claim 12 wherein the posterior probability estimation for determining whether the feature is an obstacle is determined using the following formula:

$$p(o=1|x)=\exp(\beta_0+\beta_1 x_1+\ldots+\beta_k x_k)/(1+\exp(\beta_0+\beta_1 x_1+\ldots+\beta_k x_k))$$

where x are respective vectors represented by radar feature data, image feature data, and feature motion flow data, and β are weighting factors defined by similarity between corresponding samples at time t and time t−1.

14. The vehicle obstacle detection system of claim 12 wherein the posterior probability estimation for determining whether the feature is not an obstacle is determined using the following formula:

$$p(o=0|x)=1/(1+\exp(\beta_0+\beta_1 x_1+\ldots+\beta_k x_k))$$

where x are the respective vectors represented by radar feature data, image feature data, and feature motion flow data, and β are the weight factors.

15. The vehicle obstacle detection system of claim 14 wherein a spatial smoothing technique is applied to neighboring observation cells of the occupancy grid for refining the posterior probability estimate in determining whether the feature is an obstacle.

16. The vehicle obstacle detection system of claim 15 wherein spatial smoothing identifies appearance consistencies between features occupying adjacent observation cells.

17. The vehicle obstacle detection system of claim 15 wherein a temporal smoothing technique is applied to captured images for refining the posterior probability estimate in determining whether a respective feature is an obstacle, the temporal smoothing identifying motion continuity between captured features of time-based images.

18. The vehicle obstacle detection system of claim 17 wherein the posterior probability estimate is further refined as a function of the spatial smoothing technique and the temporal smoothing technique using the following formula:

$$P_t(o=1|x)\alpha P_{t-1,c}(o=1|x)+\beta P_{t,c}(o=1|x)+\rho_l P_{t,l}(o=1|x)+\rho_r P_{t,r}(o=1|x)+\rho_u P_{t,u}(o=1|x)+\rho_d P_{t,d}(o=1|x)$$

where $\alpha P_{t-1,c}(o=1|x)$ is a temporal contribution for estimating the posterior probability, $\beta P_{t,c}(o=1|x)$ is a current contribution for estimating the posterior probability, $\rho_l P_{t,l}(o=1|x)+\rho_r P_{t,r}(o=1|x)+\rho_u P_{t,u}(0=1|x)+\rho_d P_{t,d}(o=1|x)$ is a spatial contribution for estimating the posterior probability, β is a constant of the current contribution, α is a weight defined by a similarity between corresponding samples at time t and time t−1, and $\rho_x$ is a weight defined by a spatial similarity between neighboring samples.

19. A vehicle obstacle detection system comprising:
an imaging system for capturing objects in a field of view;
a radar device for sensing objects in a substantially same field of view, the substantially same field of view being partitioned into an occupancy grid having a plurality of observation cells, the occupancy grid partitioned angularly and radially to form the plurality of observation cells;
a fusion module for receiving radar data from the radar device and imaging data from the imaging system, the fusion module projecting the occupancy grid and associated radar data onto the captured image, the fusion module extracting features from each corresponding cell using sensor data from the radar device and imaging data from the imaging system;
a preprocessing module for processing data obtained from the radar device, wherein the preprocessing module applies a constant false alarm rate technique to detect a target in the field-of-view of radar, and wherein an output from the preprocessing module is a signal-to-noise ratio of each cell that is provided to the fusion module; and
a primary classifier for determining whether an extracted feature extracted from a respective observation cell is an obstacle.

20. A method for determining an obstacle exterior of a vehicle comprising the steps of:

capturing objects in a field of view by an imaging system;

sensing objects in a substantially same field of view a radar device, partitioning the substantially same field of view sensed by the radar device into an occupancy grid having a plurality of observation cells, the occupancy grid partitioned angularly and radially to form the plurality of observation cells;

receiving, by a fusion module, radar data from the radar device and imaging data from the imaging system, the fusion module projecting the occupancy grid and associated radar data onto the captured image, the fusion module extracts features from each corresponding cell using sensor data from the radar device and imaging data from the imaging system for identifying potential obstacles;

applying a temporal smoothing technique to captured images for refining a posterior probability estimate in determining whether a respective feature is an obstacle, the temporal smoothing identifying motion continuity between captured features of time-based images; and classifying the extracted feature by a primary classifier for determining whether the extracted from a respective observation cell is an obstacle.

21. The method of claim 20 including refining the posterior probability estimate as a function of the spatial smoothing technique and the temporal smoothing technique using the following formula:

$$P_t(o=1|x) \alpha P_{t-1,c}(o=1|x) + \beta P_{t,c}(o=1|x) + \rho_l P_{t,l}(o=1|x) + \rho_r P_{t,r}(o=1|x) + \rho_u P_{t,u}(o=1|x) + \rho_d P_{t,d}(o=1|x)$$

where $\alpha P_{t-1,c}(o=1|x)$ is a temporal contribution for estimating the posterior probability, $\beta P_{t,c}(o=1|x)$ is a current contribution for estimating the posterior probability, $\rho_l P_{t,l}(o=1|x) + \rho_r P_{t,r}(o=1|x) + \rho_u P_{t,u}(o=1|x) + \rho_d P_{t,d}(o=1|x)$ is a spatial contribution for estimating the posterior probability, $\beta$ is a constant of the current contribution, $\alpha$ is a weight defined by a similarity between corresponding samples at time t and time t−1, and $\rho_x$ is a weight defined by a spatial similarity between neighboring samples.

* * * * *